United States Patent
Tanaka et al.

(10) Patent No.: US 8,524,406 B2
(45) Date of Patent: Sep. 3, 2013

(54) FUEL CELL SYSTEM AND START-UP CONTROL METHOD THEREFOR

(75) Inventors: Hiromi Tanaka, Toyota (JP); Yoshiaki Naganuma, Nissin (JP); Osamu Yumita, Nagoya (JP); Takayoshi Tezuka, Nissin (JP); Nobukazu Mizuno, Miyoshi (JP); Masashi Fuji, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 100 days.

(21) Appl. No.: 13/148,560

(22) PCT Filed: Jan. 27, 2010

(86) PCT No.: PCT/JP2010/051055
§ 371 (c)(1),
(2), (4) Date: Aug. 9, 2011

(87) PCT Pub. No.: WO2010/092871
PCT Pub. Date: Aug. 19, 2010

(65) Prior Publication Data
US 2012/0003557 A1    Jan. 5, 2012

(30) Foreign Application Priority Data

Feb. 10, 2009  (JP) ................................. 2009-028728

(51) Int. Cl.
*H01M 8/04* (2006.01)
(52) U.S. Cl.
USPC ........... 429/429; 429/408; 429/414; 429/415; 429/420; 429/427; 429/428; 429/433; 429/442
(58) Field of Classification Search
USPC ......... 429/408, 420, 442, 414–415, 426–433, 429/455–456
See application file for complete search history.

(56) References Cited

U.S. PATENT DOCUMENTS

2007/0092771 A1 *  4/2007  Wake et al. ................... 429/22

FOREIGN PATENT DOCUMENTS

| JP | 2002-313388 A | 10/2002 |
| JP | 2003-036874 A | 2/2003 |

(Continued)

OTHER PUBLICATIONS

International Search Report issued Apr. 20, 2010 of PCT/JP2010/051055.

*Primary Examiner* — Patrick Ryan
*Assistant Examiner* — Ben Lewis
(74) *Attorney, Agent, or Firm* — Kenyon & Kenyon LLP (57) ABSTRACT

An object is to suppress the degradation of durability due to a heat concentration while performing a rapid warm-up operation as necessary, when starting a fuel cell system at temperatures below freezing point. In order to achieve such an object, the present invention stores in a memory an operation termination condition of the last operation of the system, data such as the start-up temperature, or the remaining amount of product water at the time of the last scavenging; calculates the remaining amount of product water based on data read out from the memory at the time of starting the system to make judgments, from the remaining amount and the start-up temperature, on whether or not a rapid warm-up of the system is necessary and whether to start without circulating the cooling water when a rapid warm-up is necessary; and conducts, based on the judgment result provided by the judgment means, with or without circulating the cooling water, a low-efficiency power generation where a reactant gas to be supplied to the fuel cell is less than that in a normal power generation and an electronic power loss is larger than that in a normal power generation. The data includes, for example, an impedance, a temperature of the fuel cell and a scavenging air amount at the last termination of the operation of the fuel cell.

4 Claims, 5 Drawing Sheets

(56) References Cited

FOREIGN PATENT DOCUMENTS

| | | |
|---|---|---|
| JP | 2003-151597 A | 5/2003 |
| JP | 2004-030979 A | 1/2004 |
| JP | 2005-044795 A | 2/2005 |
| JP | 2006-073501 A | 3/2006 |
| JP | 2007-012565 A | 1/2007 |
| JP | 2007-042477 A | 2/2007 |
| JP | 2008-147093 A | 6/2008 |
| JP | 2008-147139 A | 6/2008 |
| JP | 2008-300218 A | 12/2008 |
| JP | 2009-026737 A | 2/2009 |
| JP | 2009-026738 A | 2/2009 |
| WO | 2008/133318 A1 | 11/2008 |
| WO | 2009/017140 A1 | 2/2009 |

\* cited by examiner

FUEL CELL SYSTEM AND START-UP CONTROL METHOD THEREFOR

This is a 371 national phase application of PCT/JP2010/051055 filed 27 Jan. 2010, claiming priority to Japanese Patent Application No. 2009-028728 filed 10 Feb. 2009, the contents of which are incorporated herein by reference.

FIELD OF THE INVENTION

The present invention relates to a fuel cell system and a start-up control method therefor. More specifically, the present invention relates to the improvements of the start performance of the fuel cell system at a low-temperature.

BACKGROUND OF THE INVENTION

When it is detected that the temperature of a fuel cell stack is below water freezing temperature (below freezing point) at the start of a fuel cell system, a control map for the normal start is changed to a control map for the start at temperatures below freezing point, and the fuel cell system is started in accordance with the control map for the start-at temperatures below freezing point. Then, if it is detected that the temperature of the fuel cell stack is above the freezing temperature, the control map for the start-at temperatures below freezing point would be changed to the control map for the normal start, and the fuel cell system would be started in accordance with the control map for the normal start. In this case, a start method may be changed based on the remaining amount of product water in the fuel cell (see, e.g., Patent Document 1).

When starting the fuel cell system at temperatures below freezing point in this way, there is also technique for improving the start performance by performing a rapid warm-up operation for rapidly increasing the temperature of the power generating section to exceed temperatures below freezing point. Such method includes, for example, a method of controlling the cooling water pressure at the inlet of a fuel cell stack lower than the pressure used for operating the fuel cell system in a steady state before completing the fuel cell stack warming-up, and controlling the cooling water pressure at the inlet of the fuel cell stack to the pressure used for the operation in a steady state after completing the fuel stack warming-up.

Furthermore, as a technique of preventing product water from freezing inside a fuel cell when starting the fuel cell in cold climate areas, there is a technique which allows a temperature sensor to detect the internal temperature of the fuel cell. In this case, cooling water pump is controlled to be in a stop state when the internal temperature of the fuel cell is 0° C. or less, and when the temperature exceeds 0° C., the driving amount thereof increases as the internal temperature rises (see, e.g., Patent Document 1).

Patent Document 1: Japanese laid-open patent publication 2008-147139 A
Patent Document 2: Japanese laid-open patent publication 2003-36874 A

SUMMARY OF THE INVENTION

However, in the case of the method of starting without circulating cooling water in the above manner, the degradation or deterioration of durability caused by a heat concentration is of concern, and therefore, it is preferable to decrease the frequency of the case.

Therefore, it is an object of the present invention to provide a fuel cell system and a start-up control method therefor configured to suppress the degradation of durability due to a heat concentration while performing a rapid warm-up operation as necessary, when starting at temperatures below freezing point.

To solve such a problem, the present inventor has performed various types of investigation. It is preferable to decrease the frequency of performing rapid warm-up operations at temperatures below freezing point in order to suppress the durability degradation of a fuel cell. On the other hand, if a method requires time to start at a temperature below freezing point, the method will not be able to meet actual situations in use. Regarding this point, in the above conventional techniques, a technique of switching maps for starting at a temperature below freezing point when the temperature of a fuel cell stack is below the freezing temperature of water has been disclosed. However, the present inventor, who has taken into consideration the durability of the stack, has paid attention to switching the methods of warming-up operations at temperatures below freezing point to perform further investigation, and has consequently found a technique capable of solving the problem above.

The present invention has been developed based on such finding, and is a fuel cell system which is provided with a fuel cell, for conducting as necessary a rapid warm-up operation for stopping the circulation of cooling water to perform a rapid warm-up by at the time of starting at a temperature below freezing point, the system comprising: a memory for storing an operation termination condition of the last operation of the system, data such as the start-up temperature, or the remaining amount of product water in the fuel cell calculated at the time of the last scavenging; judgment means for calculating the remaining amount of the product water based on data read out from the memory at the time of starting the system to make judgments, from the remaining amount and the start-up temperature, on whether or not a rapid warm-up of the system is necessary and whether to start without circulating the cooling water when a rapid warm-up is necessary; and power generation control means for executing, based on the judgment result provided by the judgment means, with or without circulating the cooling water, a low-efficiency power generation where a reactant gas to be supplied to the fuel cell is less than that in a normal power generation and an electronic power loss is larger than that in a normal power generation. The data includes an impedance, a temperature of the fuel cell and a scavenging air amount at the time of the last termination of the operation of the fuel cell. In addition, the scavenging air amount described in the present specification represents an amount of air flowed for discharging water in a fuel cell stack after the last termination of the operation at the time of the OFF-operation of the ignition switch (for example, by a driver of a vehicle).

In this fuel cell system, a judgment on whether to circulate cooling water is made based on the operation termination condition of the last operation, the start-up temperature, etc. By making this judgment, a rapid warm-up operation can be performed with no circulation of cooling water at all, but also can be performed with the circulation of cooling water depending on the situation. Thus, it is possible to suppress the frequency of starting the system without circulating cooling water.

It is preferable that the judgment means in the fuel cell system comprises an impedance measuring function for measuring an impedance of the fuel cell and an associated temperature measuring function for measuring an associated temperature of the fuel cell, and calculates the remaining amount of the product water based on data including the measurement result of the impedance and the measurement result of the associated temperature.

Further, the present invention is a fuel cell system mounted on a fuel cell vehicle, and it is also preferable that, at the time of starting at a temperature below freezing point, a judgment whether the fuel cell vehicle can drive is made by the judgment means.

It is further preferable that a graph of the start-up temperature of the fuel cell—the remaining amount of product water (Vw) is divided into a plurality of zones, and a judgment on whether to start without circulating the cooling water is made depending on which zone of the plurality of zones the start-up temperature at the time of starting the fuel cell and the remaining amount belong to.

It is still preferable that a graph of the start-up temperature of the fuel cell—the remaining amount of product water (Vw) is divided into a plurality of zones, and judgments on whether to start without circulating the cooling water and on whether the fuel cell vehicle can drive without a warm-up operation are made depending on the relationship of the start-up temperature at the time of starting the fuel cell and the remaining amount.

It is even more preferable that a graph, which is divided into a plurality of zones by spaces closed by curved lines, is used as the graph of the start-up temperature of the fuel cell—the remaining amount of product water (Vw).

Alternatively, it is still further preferable that a graph, which is divided into a plurality of zones by two or three curved lines approximated to a curve of an inverse proportion graph or a hyperbola, is used as the graph of the start-up temperature of the fuel cell—the remaining amount of the product water (Vw).

In addition, the control method according to the present invention is a start-up control method for a fuel cell system, for conducting as necessary a rapid warm-up operation for stopping the circulation of cooling water to perform a rapid warm-up by at the time of starting at a temperature below freezing point, the method comprising: storing in a memory an operation termination condition of the last operation of the system, data such as the start-up temperature, or the remaining amount of product water in the fuel cell calculated at the time of the last scavenging; calculating the remaining amount of product water based on data read out from the memory at the time of starting the system to make judgments, from the remaining amount and the start-up temperature, on whether or not a rapid warm-up of the system is necessary and whether to start without circulating the cooling water when a rapid warm-up is necessary; and executing, based on the judgment result provided by the judgment means, with or without circulating the cooling water, a low-efficiency power generation where a reactant gas to be supplied to the fuel cell is less than that in a normal power generation and an electronic power loss is larger than that in a normal power generation.

According to the present invention, it is possible to perform a rapid warm-up operation as necessary while suppressing the degradation of durability due to a heat concentration, when starting a fuel cell system at a temperature below freezing point.

DESCRIPTION OF REFERENCE SYMBOLS

1: fuel cell system, 2: fuel cell, 7: control device (judgment means, power-generation control means), 91: reference FC temperature memory (memory), 92: reference impedance memory (memory), 93: reference scavenging air amount memory (memory), 100: vehicle, Fe: scavenging air amount, Te: temperature of fuel cell at the last termination, Vw: remaining water amount

DETAILED DESCRIPTION OF THE INVENTION

Hereinafter, the configuration of the present invention will be described in detail with reference to one embodiment shown in the drawings.

Figure 1:
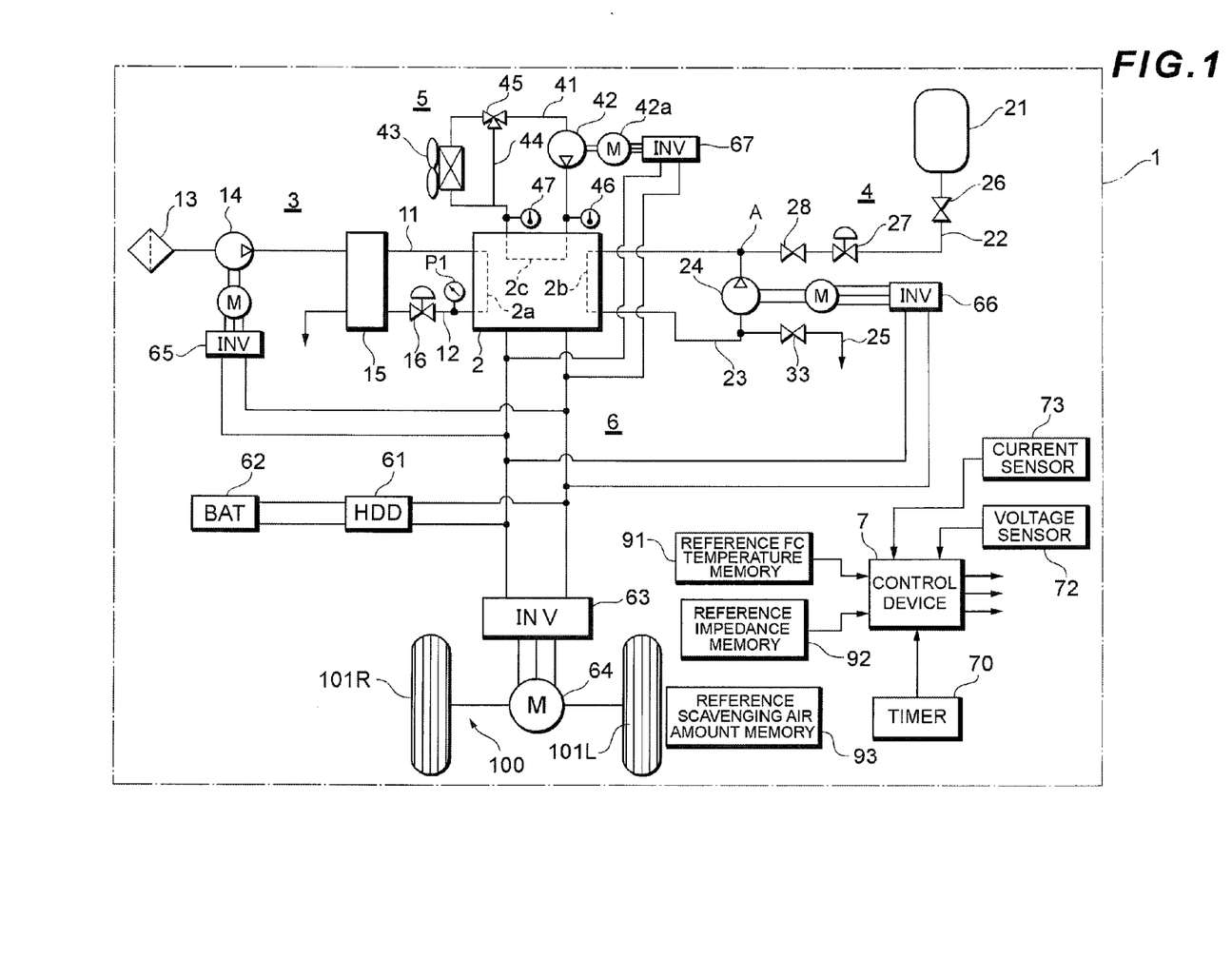
FIG. 1 is a configuration diagram showing a fuel cell system according to one embodiment of the present invention.

FIG. 1 is a configuration diagram of a fuel cell system 1 in the present embodiment. The fuel cell system 1 can be mounted on a vehicle 100 such as a fuel cell vehicle (FCHV), an electric vehicle, a hybrid vehicle or the like. Further, the fuel cell system 1 is also applicable to various mobile objects other than the vehicle 100 (e.g. a ship, an airplane, a robot or the like), a stationary power source and a potable fuel cell system.

The fuel cell system 1 comprises: a fuel cell 2; an oxidizing gas piping system 3 which supplies air as the oxidizing gas to the fuel cell 2; a fuel gas piping system 4 which supplies a hydrogen gas as the fuel gas to the fuel cell 2; a refrigerant piping system 5 which supplies a refrigerant to the fuel cell 2; a power system 6 which charges/discharges the power of the system 1; and a control device 7 which generally controls the operation of the system 1. The oxidizing gas and fuel gas can be collectively referred to as a reactant gas.

The fuel cell 2 is constituted of, for example, a solid polymer electrolyte type fuel cell, and includes a stack structure in which a large number of unit cells are stacked. Each unit cell has a solid polymer membrane with proton conductivity in the electrolyte layer, has an air pole (cathode) on one face of an electrolyte, and a fuel pole (anode) on the other face of the electrolyte, and further has a pair of separators which sandwich the air pole and the fuel pole from both sides. The oxidizing gas is supplied to an oxidizing gas passage 2a of one separator, and the fuel gas is supplied to a fuel gas passage 2b of the other separator. The fuel cell 2 generates a power by the electrochemical reaction of the supplied fuel gas and oxidizing gas.

The oxidizing gas piping system 3 has a supply passage 11 through which the oxidizing gas to be supplied to the fuel cell 2 flows, and an exhaust passage 12 through which an oxidizing off gas discharged from the fuel cell 2 flows. The supply passage 11 communicates with exhaust passage 12 through the oxidizing gas passage 2a. The oxidizing off gas is in a highly wet state because it contains water produced by the electrochemical reaction of the fuel cell 2.

The supply passage 11 is provided with a compressor 14 which takes outside air via an air cleaner 13, and a humidifier 15 which humidifies the oxidizing gas to be forwarded under pressure to the fuel cell 2 by the compressor 14. The humidifier 15 exchanges water contents between the oxidizing gas flowing through the supply passage 11 in a low wet state and the oxidizing gas flowing through the exhaust passage 12 in a high wet state to moderately humidify the oxidizing gas to be supplied to the fuel cell 2.

The back pressure on the air pole side of the fuel cell 2 is adjusted by a back pressure adjustment valve 16 which is positioned at the exhaust passage 12 near the outlet of the cathode. A pressure sensor P1 for detecting the pressure in the exhaust passage 12 is provided in the vicinity of the back pressure adjustment valve 16. The oxidizing off gas passes through the back pressure adjustment valve 16 and the humidifier 15, and is eventually discharged as an exhaust gas to the atmosphere outside the system.

The fuel gas piping system 4 has a hydrogen supply source 21; a supply passage 22 through which the hydrogen gas to be supplied from the hydrogen supply source 21 to the fuel cell 2 flows; a circulation passage 23 for returning, to a joining part A of the supply passage 22, a hydrogen off gas (a fuel off gas) discharged from the fuel cell 2; a pump 24 which forwards under pressure the hydrogen off gas in the circulation passage 23 to the supply passage 22; and a purge passage 25 branched and connected to the circulation passage 23. An original valve 26 is opened, whereby the hydrogen gas flows out from the hydrogen supply source 21 to the supply passage 22, passes through a regulator valve 27, other pressure reduction valves and a blocking valve 28, and then is supplied to the fuel cell 2. The purge passage 25 is provided with a purge valve 33 for discharging the hydrogen off gas to a hydrogen diluter (not shown).

The refrigerant piping system (a cooling mechanism) 5 has a refrigerant passage 41 which communicates with a cooling passage 2c in the fuel cell 2; a cooling pump 42 provided in the refrigerant passage 41; a radiator 43 which cools the refrigerant to be discharged from the fuel cell 2; a bypass passage 44 which bypasses the radiator 43; and a changeover valve 45 which sets the passing of cooling water through the radiator 43 and the bypass passage 44. The refrigerant passage 41 has a temperature sensor 46 provided in the vicinity of the refrigerant inlet of the fuel cell 2; and a temperature sensor 47 provided in the vicinity of the refrigerant outlet of the fuel cell 2. A refrigerant temperature (an associated temperature of the fuel cell) detected by the temperature sensor 47 reflects the internal temperature of the fuel cell 2 (hereinafter referred to as the "FC temperature"). The temperature sensor 47 may be configured to detect the temperature of components surrounding the fuel cell 2 (an associated temperature of the fuel cell) or the temperature of the outside air surrounding the fuel cell 2 (an associated temperature of the fuel cell), instead of (or in addition to) the refrigerant temperature. Further, the cooling pump 42 circulates and supplies the refrigerant in the refrigerant passage 41 to the fuel cell 2 by a motor drive.

A power system 6 includes a high-pressure DC/DC converter 61, a battery 62, a traction inverter 63, a traction motor 64 and various auxiliary apparatus inverters 65, 66 and 67.

The high-pressure DC/DC converter 61 is a direct-current voltage converter, and has a function of adjusting a direct-current voltage input from the battery 62 to output the voltage to a traction inverter 63 side and a function of adjusting a direct-current voltage input from the fuel cell 2 or the traction motor 64 to output the voltage to the battery 62. These functions of the high-pressure DC/DC converter 61 realize the charging/discharging of the battery 62. Moreover, the high-pressure DC/DC converter 61 controls the output voltage of the fuel cell 2.

The battery (an electrostatic condenser) 62 is a secondary battery capable of being charged/discharged, and is constituted by a nickel hydrogen battery or the like, for example. Other various types of secondary batteries are applicable. Further, electrostatic condensers, other than second batteries, capable of being charged/discharged, for example, a capacitor may be used instead of the battery 62.

The traction inverter 63 converts a direct current into a three-phase alternate current to supply the current to the traction motor 64. The traction motor 64 is, for example, a three-phase alternate-current motor. The traction motor 64 constitutes a main power source of, for example, the vehicle 100 in which the fuel cell system 1 is mounted, and is coupled to wheels 101L, 101R of the vehicle 100. Auxiliary device inverters 65, 66, 67 control the driving of the motors of the compressor 14, the pump 24 and the cooling pump 42, respectively.

The control device 7 is constituted as a micro computer including therein a CPU, a ROM and a RAM. The CPU executes desired computation in accordance with a control program to perform various types of processing and controls, for example, the control of normal operations and the control of warm-up operations described later. The ROM stores the control program and control data to be processed by the CPU. The RAM is used as any type of operation region mainly for control processing.

A timer 70, a voltage sensor 72 and a current sensor 73 are connected to the control device 7. The timer 70 measures various times required for controlling the operation of the fuel cell system 1. The voltage sensor 72 detects the output voltage (FC voltage) of the fuel cell 2. Specifically, the voltage sensor 72 detects a voltage generated by each of a plurality of unit cells of the fuel cell 2 (hereinafter referred to as the "cell voltage"). This detection allows for grasping the state of each unit cell of the fuel cell 2. The current sensor 73 detects the output current (FC current) of the fuel cell 2.

The control device 7 inputs detection signals from various sensors, such as various types of the pressure sensor P1, the temperature sensors 46, 47 and an accelerator opening degree sensor for detecting the accelerator opening degree of the vehicle 100, to output control signals to each of the constituting elements (the compressor 14, the back pressure adjustment valve 16 and the like). The control device 7 also evaluates the water content state in the fuel cell 2 at a predetermined timing to control the water content in the fuel cell 2 based on the evaluation result.

In the present embodiment, a low-efficiency power generation is conducted as necessary at the time of starting the fuel cell system 1 so that the amount of reactant gas to be supplied to the fuel cell 2 is smaller than that in a normal power generation and the electronic power loss is larger than that in a normal power generation, whereby a rapid warm-up is performed. The difference between a low-efficiency power generation and normal power generation will be described below (see FIG. 2).

Figure 2:
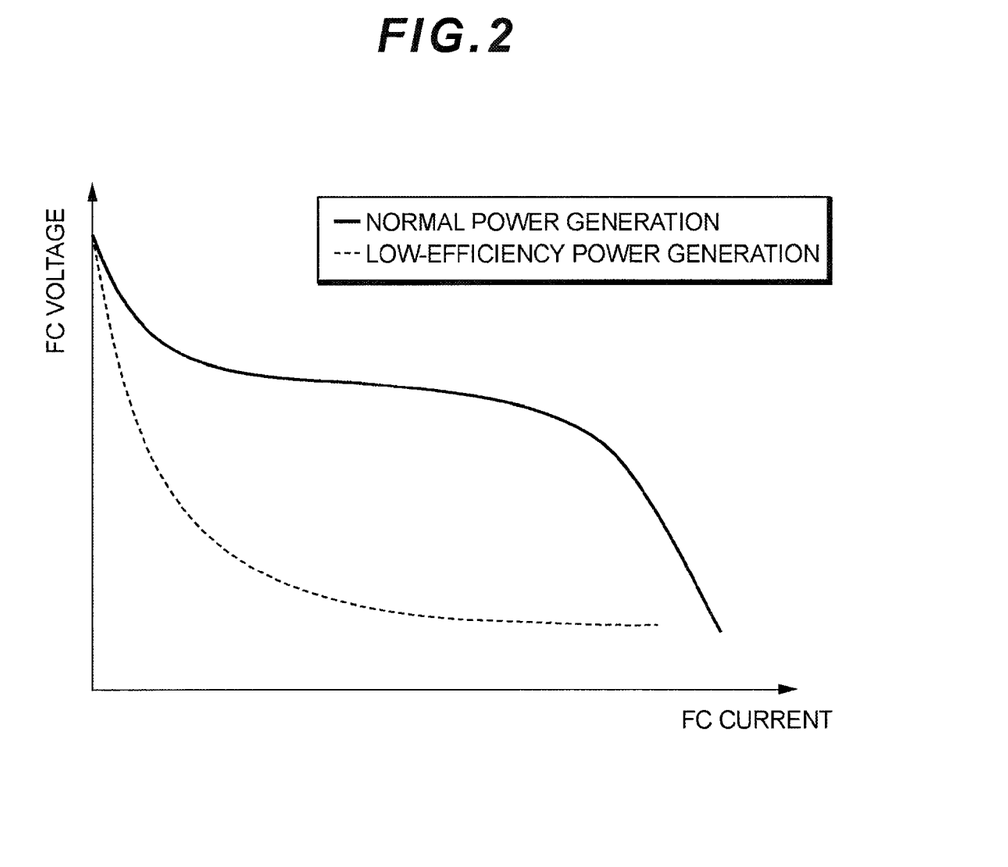
FIG. 2 is a diagram showing the relationship of an output current (FC current) and an output voltage (FC voltage) of a fuel cell.

FIG. 2 is a diagram showing the relationship of the output current (FC current) and output voltage (FC voltage) of a fuel cell, where the case of performing a normal power generation is shown by the solid line and the case of performing a low-efficiency power generation is shown in the dotted line. Here, the horizontal axis represents the FC current and the vertical axis represents the FC voltage.

In the present specification, a low-efficiency power generation means a power generation in which the amount of reactant gas (in the present embodiment, an oxidizing gas) to be supplied to the fuel cell 2 is smaller than that in a normal power generation and the electronic power loss is larger than that in a normal power generation, and the fuel cell 2 is operated in a condition where, for example, the air stoichiometric ratio is narrowed down to around 1.0 (theoretical value) (see the dotted line portion in FIG. 2). Thus, the fuel cell 2 can be rapidly warmed up by setting the electronic power loss large. On the other hand, in a normal power generation, the fuel cell 2 is operated in a condition where, for example, the air stoichiometric ratio is set to 2.0 or more (theoretical value) such that a high power generation efficiency can be obtained while suppressing the electronic power loss. The control device 7 serves as, as necessary, power generation control means for executing a low-efficiency power generation in which the amount of reactant gas to be supplied to the fuel cell 2 is smaller than that in a normal power generation and the electronic power loss is larger than that in a normal power generation.

Next, an impedance measurement, etc. will be described.

First, the control device 7 judges whether or not the timing for evaluating a water content state in the fuel cell 2 (hereinafter referred to as the "evaluation timing") has come. The evaluation timing is, for example, the time of terminating or starting the operation of the fuel cell system 1. The control device 7 in the present embodiment detects that an instruction for terminating the operation of the fuel cell system 1 is input by, for example, the OFF-operation of the ignition switch performed by a driver of the vehicle 100, and thereby makes the judgment that the evaluation timing has come.

The control device (impedance measurement means) 7 performs an impedance measurement on the fuel cell 2, and evaluates the water content state in the fuel cell 2 based on the measurement result. The control device (impedance measurement means) 7 samples an FC voltage detected by the voltage sensor 72 and an FC current detected by the current sensor 73 at a predetermined sampling rate, and performs Fourier Transform processing (FFT operation processing or DFT operation processing) thereon. Then, the control device (impedance measurement means) 7 measures the impedance of the fuel cell 2 by, for example, dividing a post-Fourier Transform processing FC voltage signal by a post-Fourier Transform processing FC current.

Subsequently, the control device 7 reads out a reference impedance IPth stored in a reference impedance memory 92, and compares the read-out reference impedance IPth with the measured impedance (hereinafter referred to as the "measurement impedance").

In this case, the reference impedance IPth is a reference value for judging whether or not the fuel cell 2 is in a dry state, and is obtained by an experiment or the like beforehand. More specifically, an impedance for judging whether or not the fuel cell 2 is in a dry state is obtained by an experiment, and the obtained impedance is mapped and stored in the reference impedance memory 92.

Further, the control device 7 compares an FC temperature detected by the temperature sensor 47 (hereinafter referred to as the "detected FC temperature") with a reference FC temperature stored in a reference FC temperature memory 91. Here, a reference FC temperature Tth is a reference value for judging whether or not the fuel cell 2 allows a low-efficiency power generation, and is obtained by an experiment beforehand. More specifically, an FC temperature for judging whether or not a low-efficiency power generation is allowed is obtained by an experiment, and the obtained temperature is mapped and stored in the reference FC temperature memory 91.

Next, a specific example of the start-up control for the fuel cell system 1 of the present embodiment will be described (see FIGS. 3-8).

First Embodiment

Figure 3:
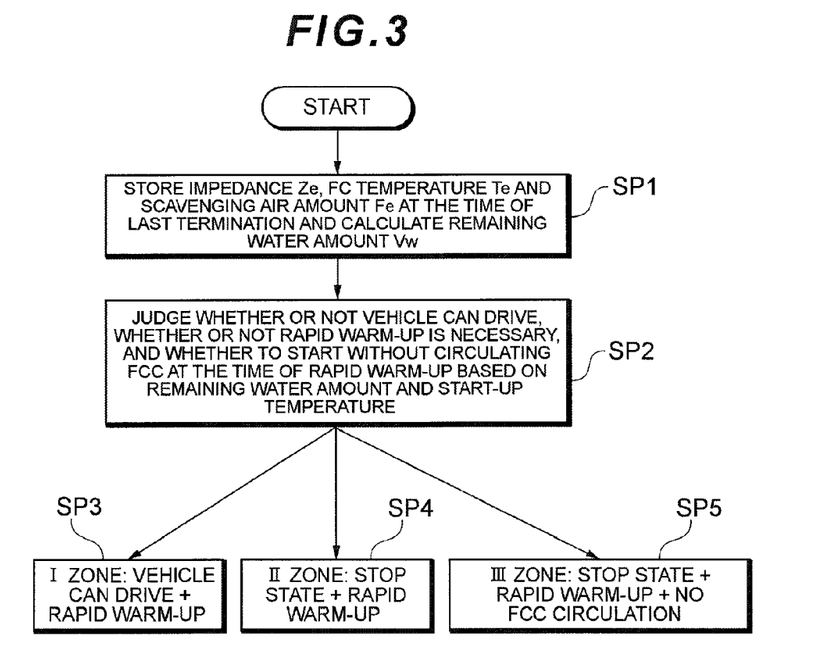
FIG. 3 is a flow chart showing a control method at the time of starting a system in the first embodiment of the present invention.

First, in this fuel cell system 1, the temperature of the fuel cell 2 (FC temperature) Te, an impedance Ze, and a scavenging air amount (an amount of air flowed for discharging water in a fuel cell stack after the last termination of the operation, for example, at the time of the OFF-operation of the ignition switch by a driver of a vehicle) Fe at the last termination of the operation of the system are stored in memory (the reference FC temperature memory 91, the reference impedance memory 92, and the reference scavenging air amount memory 93), and they can be read out anytime. At the time of starting the fuel cell system 1, each piece of data stored in these memory 91-93 is read out and the remaining water amount Vw of the fuel cell 2 is calculated based on these data (step SP1). Data calculated and stored in memory at the last scavenging may be used as the remaining water amount Vw, or such remaining water amount Vw can be calculated by, for example, the following formula:

Remaining water amount $V1$ obtained from impedance=$E/(Z0-F)+G$     [Formula 1]

In the formula 1, Z0 represents an ambient temperature impedance, and can be obtained by:

Ambient temperature impedance $Z0=A*(Te-B)*(Ze-C)+C$     [Formula 2]

In the formula above, each of A, B, C, D, E, F and G is a constant which varies depending on the system.

Further, the remaining water amount Vw can be calculated by the following formula 3 with the scavenging air amount Fe. In the formula below, Pe represents a saturated water vapor pressure, and J and H are constants which change depending on the system.

Remaining water amount $V2$ obtained from scavenging air amount=$J-H*\Sigma(Fe*Pe)$     [Formula 3]

As described above, after obtaining the two kinds of remaining water amounts V1 and V2 based on the formulas 1 and 3, the remaining water amount Vw can be obtained by Vw=MAX (V1, V2). More specifically, the greater of the above-mentioned two kinds of remaining water amounts V1 and V2 is used as the remaining water amount Vw.

Subsequently, based on the remaining water amount Vw and the start-up FC temperature, whether or not the vehicle 100 can drive, whether or not a rapid warm-up is necessary, and whether or not a rapid warm-up should be performed without the circulation of cooling water (FCC) are judged (step SP2). In the present embodiment, each of I, II, III zones (areas) are defined in a graph in which the vertical axis represents start-up FC temperatures and the horizontal axis represents remaining water amounts Vw, and whether or not the vehicle 100 can drive is determined depending on which zone the combination of the remaining water amount Vw and the start-up FC temperature is located (see FIG. 4).

Figure 4:
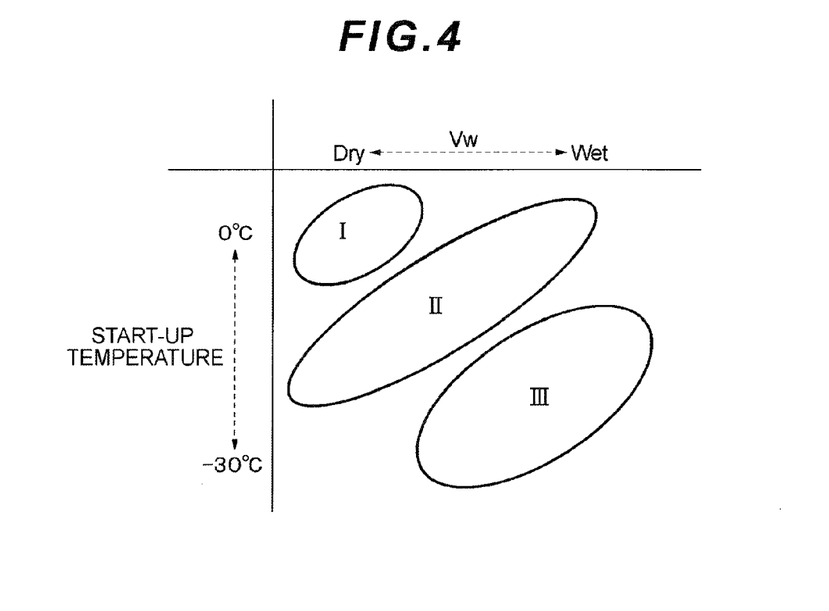
FIG. 4 is a graph in which the vertical axis indicates the internal temperature (FC temperature) of a fuel cell at the time of starting and the horizontal axis indicates the remaining water amount Vw, the graph showing an example where three zones I, II and III are defined.

More specifically, if the combination falls under the I zone which is an area in which the start-up FC temperature is high within a predetermined range and the remaining water amount Vw is small (i.e. dry), the control device 7 makes the judgment that the vehicle 100 can drive and a rapid warm-up with the circulation of cooling water (FCC) is available (step SP3). If the combination falls under the III zone which is an area in which the start-up FC temperature is low and the remaining water amount Vw is large (i.e. wet), the control device 7 makes the judgment that the vehicle 100 is in a stop state (i.e. cannot drive) and a rapid warm-up should be performed without the circulation of cooling water (step SP5). Further, if the combination does not fall under any of these I zone and III zone, but falls under the II zone, the control device 7 makes the judgment that the vehicle 100 is in a stop-state (i.e. cannot drive) and a rapid warm-up should be performed with the circulation of cooling water (step SP4).

In the case of the present embodiment, in the above I zone, a warm-up delays because an I-V point move toward the output side during the time in which a rapid warm-up is performed with the vehicle running (in FIG. 2 (I-V curve) showing the relationship of the output current (FC current) and the output voltage (FC voltage)). Further, in the II and III zones, a rapid warm-up is performed in a stop state (a warm-up allows the temperature to exceed the freezing point).

In the present embodiment, when the judgment is made that the combination falls under the I zone, a warm-up processing in the case where the combination falls under the II zone is performed, and then the processing for the I zone is performed. More specifically, in the case of the present embodiment which is designed for the fuel cell system 1 mounted on the vehicle 100, a system start-up is performed in a stop state, therefore, even when the judgments are made that the combination falls under the I zone and the vehicle can drive, a warm-up processing is performed in a stop state as in the case of falling under the II zone, and then the processing for the I zone is performed (see FIG. 3).

As describe above, in the present embodiment, the relationships of the start-up FC temperatures and the remaining water amounts Vw of the fuel cell system 1 are zoned, allowing the convenience and durability of the system 1 to be improved at the same time. More specifically, when performing a rapid warm-up in the system 1, the rapid warm-up is performed under a condition where no cooling water is circulated only when the combination falls under the III zone as described above, so that the frequency of performing a rapid warm-up under a condition where cooling water is not circulated (i.e. no circulation) is suppressed. Thus, the degradation of durability caused by a heat concentration can be suppressed.

Further, various kinds of rapid warm-up modes are set beforehand in accordance with the number of zones, and a rapid warm-up mode to be performed can be chosen therefrom depending on the relationship of an FC temperature and the remaining water amount Vw, therefore the convenience at the time of starting a system is particularly high. More specifically, in the case of the I zone which is the most frequent zone, a vehicle becomes ready for a drive immediately, so there is no need to keep a user, such as a driver, waiting, and as a result, the usability will not be deteriorated. On the other hand, in the case of falling under the III zone, which is a less frequent zone, the circulation of cooling water is stopped and a warm-up is performed rapidly to reduce as much as possible the time that a user spends waiting in extremely cold weather. Furthermore, stopping the circulation of cooling water as necessary to perform a rapid warm-up will ease the driver's anxiety. In addition, in the case of the II zone, there are effects that the time that a user spends waiting can be reduced by a rapid warm-up and the degradation of the durability of the fuel cell 2 can be suppressed by performing a rapid warm-up with circulating cooling water.

Second Embodiment

In the above first embodiment, three zones (areas) are defined in the graph of FC temperatures and remaining water amounts Vw, however, the number of zones are not limited to the above. For example, in the present embodiment, four of I-IV zones (areas) are defined in a graph in which the vertical axis represents start-up FC temperatures and the horizontal axis represents remaining water amounts Vw, and whether or not the vehicle 100 can drive is judged depending on which zone the combination of the remaining water amount Vw and the start-up FC temperature is located (see FIGS. 5, 6).

Figure 5:
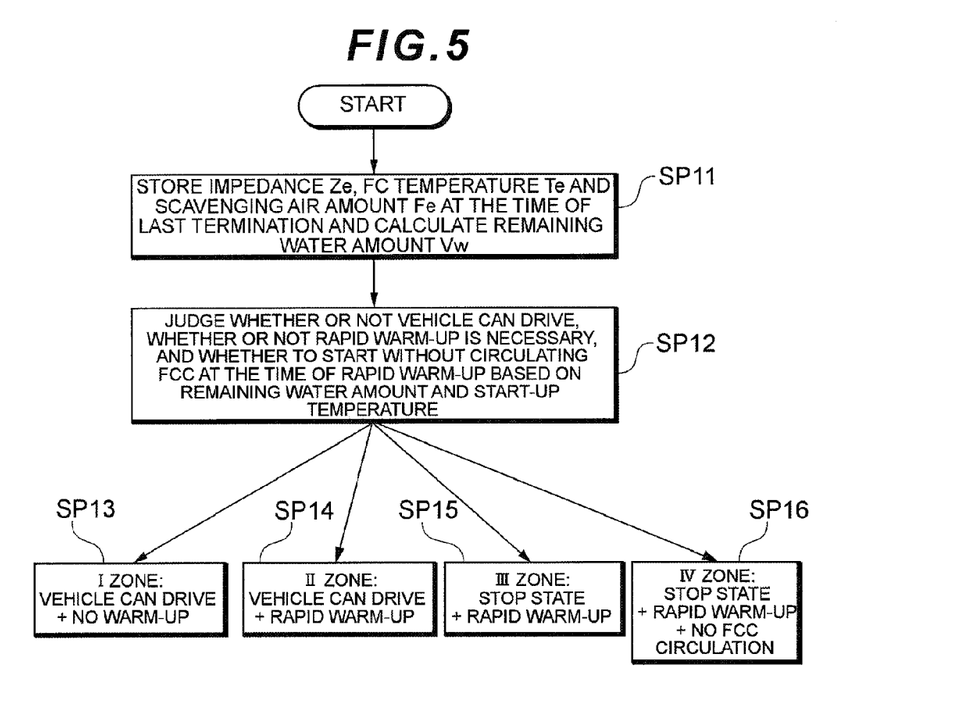
FIG. 5 is a flow chart showing a control method at the time of starting a system in the second embodiment of the present invention.

First, the temperature of the fuel cell 2 (FC temperature) Te, an impedance Ze, and a scavenging air amount Fe at the last termination of the operation of the fuel cell system 1 are stored in memory (the reference FC temperature memory 91, the reference impedance memory 92, and the reference scavenging air amount memory 93). At the time of the starting the fuel cell system 1, each piece of data stored in these memory 91-93 is read out and the remaining water amount Vw of the fuel cell 2 is calculated based on these data (step SP11). The remaining water amount Vw can be obtained, in the same manner as the aforementioned embodiment, by calculating the remaining water amount V1 obtainable from an impedance and the remaining water amount V2 obtainable from a scavenging air amount based on the formulas 1-3 and choosing the greater value.

Figure 6:
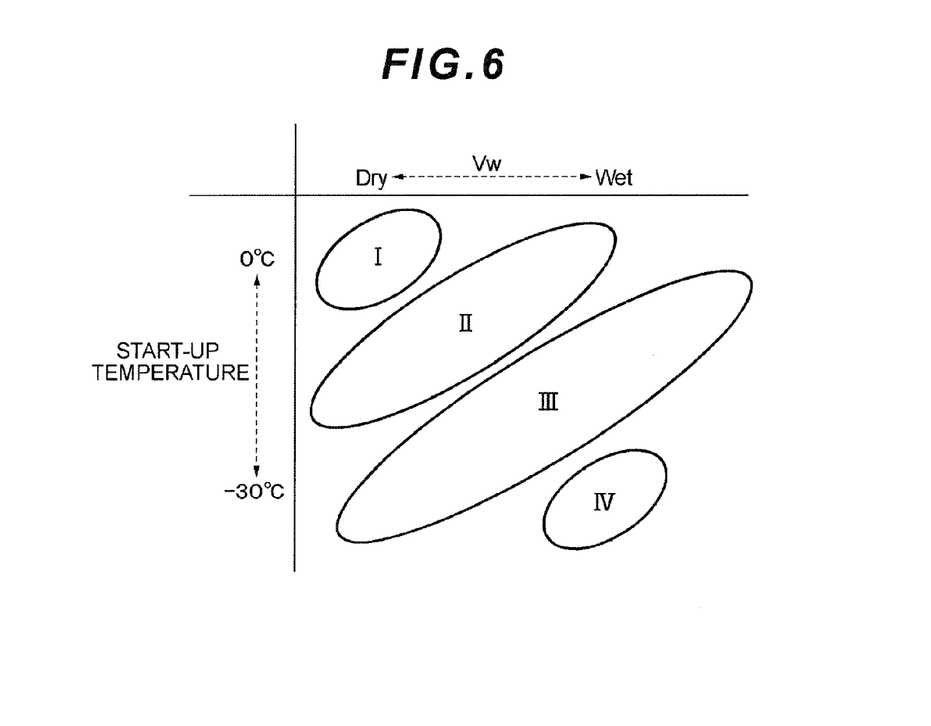
FIG. 6 is a graph of start-up FC temperature—the remaining water amount Vw, the graph showing an example where four zones I-IV are defined.
Figure 7:
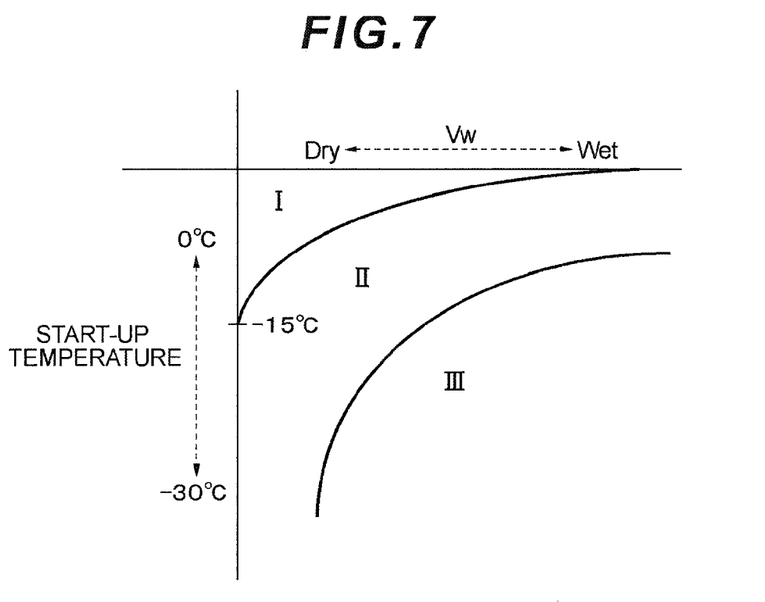
FIG. 7 is a graph of start-up FC temperature—the remaining water amount Vw in the third embodiment of the present invention, and showing three zones I-III defined therein.

Then, whether or not the vehicle 100 can run, whether or not a rapid warm-up is necessary, and whether or not a rapid warm-up should be performed without the circulation of cooling water (FCC) are judged based on the remaining water amount Vw and the start-up FC temperature (step SP12). In the present embodiment, each of I, II, III, IV zones (areas) are defined in a graph in which the vertical axis represents start-up FC temperatures and the horizontal axis represents remaining water amounts Vw, and whether or not the vehicle 100 can drive is determined depending on which zone the combination of the remaining water amount Vw and the start-up FC temperature is located.

More specifically, if the combination falls under the I zone which is an area in which the start-up FC temperature is high and the remaining water amount Vw is small (i.e. dry), the control device 7 makes the judgment that the vehicle 100 can drive and a rapid warm-up is not necessary (step SP13). Meanwhile, if the combination falls under the IV zone which is an area in which the start-up FC temperature is low and the remaining water amount is large (i.e. wet), the control device 7 makes the judgment that the vehicle 100 is in a stop state (i.e. cannot drive) and a rapid warm-up should be performed without the circulation of cooling water (step SP16). Further, if the combination falls under the II zone, which is located nearer the I zone in between I zone and IV zone, the control device 7 makes the judgment that the vehicle 100 can drive but a rapid warm-up is necessary (step SP14). A rapid warm-up in this case is performed with the circulation of cooling water. Furthermore, if the combination falls under the III zone, which is located between the aforementioned II zone and IV zone, the control device 7 makes the judgment that the vehicle 100 is in a stop-state (i.e. cannot drive) and a rapid warm-up is necessary (step SP15). A rapid warm-up in this case is also performed with the circulation of cooling water.

In the present embodiment, when the judgment is made that the combination falls under the I zone or III zone, a warm-up processing in the case where the combination falls under the III zone is performed, then the processing for the II zone is performed, and, depending on the situation, the processing for the I zone is performed. As in the first embodiment described above, in the present embodiment which is designed for the fuel cell system 1 mounted on the vehicle 100, a system start-up is performed in a stop state, therefore, even when the judgments are made that the combination falls under the I zone or II zone and the vehicle can drive, a warm-up processing is performed in a stop state as in the case of falling under the III zone, and then the processing for the II zone, or possibly the I zone, is performed (see FIG. 3). These I, II and III zones may be divided in such a manner from the beginning.

Third Embodiment

In the first and second embodiments described above, substantially elliptical shaped zones are defined in the graph of FC temperatures and remaining water amounts Vw (see FIGS. 4 and 6), but shapes of the zones are not limited to the above. For example, in the present embodiment, the graph is divided into three zones, namely, I zone where the start-up FC temperature is high and the remaining water amount Vw is small (i.e. dry), III zone where the start-up FC temperature is low and the remaining water amount Vw is large (i.e. wet) and II zone which is the intermediate zone of these two zones, by two curved lines (e.g. curved lines approximated to a curve of an inverse proportion graph or a hyperbola) (see FIG. 7). Meanwhile, the calculation of the remaining water amount Vw, the judgments on whether or not the vehicle 100 can drive, whether or not a rapid warm-up is necessary, and whether or not a rapid warm-up should be performed without the circulation of cooling water (FCC) can be made in the same manner as in the first embodiment.

Fourth Embodiment

Figure 8:
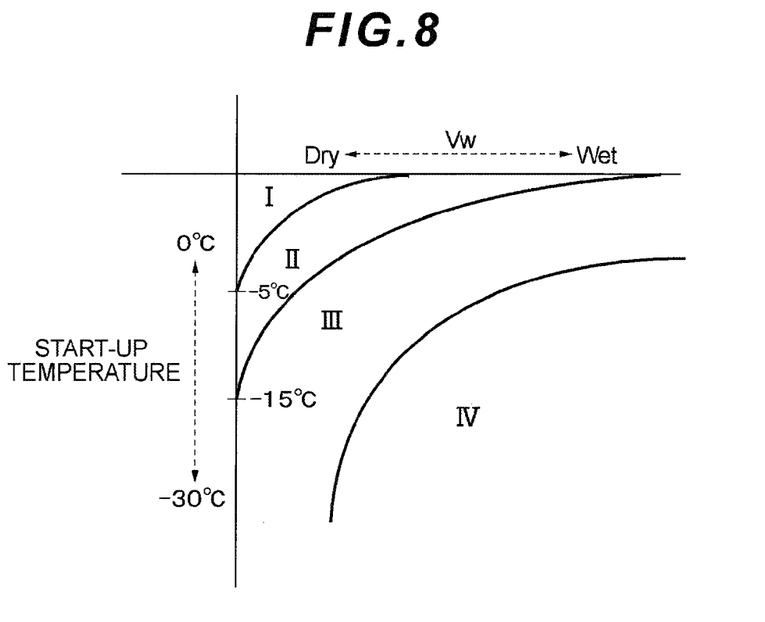
FIG. 8 is a graph of start-up FC temperature—the remaining water amount Vw in the fourth embodiment of the present invention, and showing four zones I-IV defined therein.

In the present embodiment, the graph is divided into four zones, namely, I zone where the start-up FC temperature is high and the remaining water amount Vw is small (i.e. dry), IV zone where the start-up FC temperature is low and the remaining water amount Vw is large (i.e. wet) and II and III zones which are located between these two zones, by three curved lines (e.g. curved lines approximated to a curve of an inverse proportion graph or a hyperbola) (see FIG. 8). Meanwhile, the calculation of a remaining water amount Vw, the judgments on whether or not the vehicle 100 can drive, whether or not a rapid warm-up is necessary, and whether or not a rapid warm-up should be performed without the circulation of cooling water (FCC) can be made in the same manner as in the second embodiment.

Note that, although the embodiments above are examples of preferred embodiments of the present invention, the present invention is not limited thereto and various modifications may be made without departing from the scope of the present invention.

Industrial Applicability

According to the present invention, when starting a fuel cell system at temperatures below freezing point, the degradation of durability due to a heat concentration can be suppressed while performing a rapid warm-up operation as necessary. Therefore, the present invention can be widely used in a fuel cell system having such a demand.

What is claimed is:

1. A fuel cell system including a fuel cell, for conducting, depending on a necessity of a warm-up, a rapid warm-up operation performing a rapid warm-up on the fuel cell at the time of starting at a temperature blow freezing point, the system comprising:

a memory programmed to store an operation termination condition of the last operation of the system;

a judgment device which calculates a remaining amount of product water based on data read out from the memory at the time of starting the system to make judgments, from the remaining amount and a start-up associated temperature which reflects an internal temperature of the fuel cell at the time of starting, on whether or not a rapid warm-up of the system is necessary and whether to start without circulating the cooling water of the fuel cell when a rapid warm-up is necessary; and a power generation control device which conducts the rapid warm-up operation by executing, based on the judgment result provided by the judgment device, with or without circulating the cooling water, a low-efficiency power generation where a reactant gas to be supplied to the fuel cell is less than that in a normal power generation and an electronic power loss is larger than that in a normal power generation, wherein the judgment device comprises an impedance measuring function programmed to measure an impedance of the fuel cell and an associated temperature measuring function programmed to measure an associated temperature which reflects the internal temperature of the fuel cell, and calculates the remaining amount of the product water by a formula based on data including the measurement result of the impedance at the time of the last termination of the operation and the measurement result of the associated temperature, wherein the data includes an impedance at the time of the last termination of the operation of the fuel cell, the associated temperature at the time of the last termination of the operation of the fuel cell, and an accumulated amount of scavenging air for discharging water in the fuel cell at the time of the last termination of the operation of the fuel cell, wherein a graph of the start-up associated temperature of the fuel cell—the remaining amount of the product water (Vw) is divided into a plurality of zones, and a judgment whether to start without circulating the cooling water is made depending on which zone of the plurality of zones the start-up associated temperature at the time of starting the fuel cell and the remaining amount at the time of starting the fuel cell belong to, and wherein the fuel cell system is mounted on a fuel cell vehicle, and, at the time of starting at a temperature below freezing point, a judgment whether the fuel cell vehicle can drive is made by the judgment device.

2. The fuel cell system according to claim 1, wherein a graph of the start-up associates temperature of the fuel cell—the remaining amount of the product water is divided into a plurality of zones, and judgments on whether to start without circulating the cooling water and on whether the fuel cell vehicle can drive without a warm-up operation is made depending on a relationship of the start-up temperature at the time of starting the fuel cell and the remaining amount.

3. The fuel cell system according to claim 1, wherein a graph, which is divided into a plurality of zones by spaces closed by curved lines, is used as the graph of the start-up associated temperature of the fuel cell—the remaining amount of the product water.

4. The fuel cell system according to claim 1, wherein a graph, which is divided into a plurality of zones by two or three curved lines approximated to a curve of an inverse proportion graph or a hyperbola, is used as the graph of the start-up associated temperature of the fuel cell—the remaining amount of the product water.

* * * * *